US007219429B2

(12) United States Patent
Silverbrook

(10) Patent No.: US 7,219,429 B2
(45) Date of Patent: May 22, 2007

(54) METHOD FOR FORMING A MICROELECTROMECHANICAL FLUID EJECTION DEVICE

(75) Inventor: Kia Silverbrook, Balmain (AU)

(73) Assignee: Silverbrook Research Pty Ltd, Balmain, NSW (AU)

(*) Notice: Subject to any disclaimer, the term of this patent is extended or adjusted under 35 U.S.C. 154(b) by 229 days.

(21) Appl. No.: 11/026,032

(22) Filed: Jan. 3, 2005

(65) Prior Publication Data

US 2005/0109731 A1 May 26, 2005

Related U.S. Application Data

(63) Continuation of application No. 10/728,784, filed on Dec. 8, 2003, now abandoned, which is a continuation-in-part of application No. 10/307,330, filed on Dec. 2, 2002, now Pat. No. 6,666,544, which is a continuation of application No. 10/120,439, filed on Apr. 12, 2002, now Pat. No. 6,536,874.

(51) Int. Cl.
*B21D 53/76* (2006.01)
*G01D 15/00* (2006.01)
*B41J 2/04* (2006.01)

(52) U.S. Cl. ...................... 29/890.1; 29/25.35; 29/830; 29/831; 29/832; 216/27; 347/54

(58) Field of Classification Search ............... 29/890.1, 29/25.35, 830, 831, 832; 347/54, 68–72; 310/328–330; 216/27; 399/261; 361/700
See application file for complete search history.

(56) References Cited

U.S. PATENT DOCUMENTS

| | | | | |
|---|---|---|---|---|
| 4,599,628 | A * | 7/1986 | Doring et al. | 347/71 |
| 4,883,219 | A * | 11/1989 | Anderson et al. | 228/190 |
| 4,937,597 | A * | 6/1990 | Yasuhara et al. | 347/71 |
| 5,245,244 | A * | 9/1993 | Takahashi et al. | 310/328 |
| 5,726,693 | A | 3/1998 | Sharma et al. | |
| 6,243,113 | B1 * | 6/2001 | Silverbrook | 347/54 |
| 6,364,453 | B1 | 4/2002 | Silverbrook | |
| 6,536,874 | B1 | 3/2003 | Silverbrook | |
| 6,666,544 | B2 | 12/2003 | Silverbrook | |
| 6,991,317 | B2 | 1/2006 | Silverbrook | |

FOREIGN PATENT DOCUMENTS

WO WO 00/23279 4/2000

* cited by examiner

*Primary Examiner*—A. Dexter Tugbang
*Assistant Examiner*—Tai Van Nguyen

(57) ABSTRACT

A microelectromechanical fluid ejection device is formed upon a wafer upon which an interconnect layer is disposed. The fluid ejection device includes a number of fluid passageways that are produced by firstly forming a bore through the interconnect layer, from the interconnect layer side, to a depth that is greater than the interface. A second bore is back-etched through the underside of the wafer. The first and second bores meet to form the fluid passageway. Fabricating the ejection device in accordance with the disclosed method avoids etchant traveling along the interface and potentially damaging CMOS circuits located at the interface.

9 Claims, 15 Drawing Sheets

METHOD FOR FORMING A MICROELECTROMECHANICAL FLUID EJECTION DEVICE

This is a Continuation Ser. No. 10/728,784 filed on Dec. 8, 2003 now abandoned of which is a continuation in part of Ser. No. 10/307,330 filed on Dec. 2, 2002 now U.S. Pat. No. 6,666,544 which is a continuation of Ser. No. 10/120,439 filed on Apr. 12, 2002 now U.S. Pat. No. 6,536,874 all of which are herein incorporated by reference.

STATEMENT REGARDING FEDERALLY SPONSORED RESEARCH OR DEVELOPMENT

Not Applicable

FIELD OF THE INVENTION

This invention relates to the fabrication of fluid ejection chips. More particularly, this invention relates to fabrication techniques of fluid ejection chips that minimize the spacing between adjacent nozzles.

REFERENCED PATENT APPLICATIONS

The following applications are incorporated by reference:

| | | | | | |
|---|---|---|---|---|---|
| 6362868 | 6227652 | 6213588 | 6213589 | 6231163 | 6247795 |
| 6394581 | 6244691 | 6257704 | 6416168 | 6220694 | 6257705 |
| 6247794 | 6234610 | 6247793 | 6264306 | 6241342 | 6247792 |
| 6264307 | 6254220 | 6234611 | 6302528 | 6283582 | 6239821 |
| 6338547 | 6247796 | 6557977 | 6390603 | 6362843 | 6293653 |
| 6312107 | 6227653 | 6234609 | 6238040 | 6188415 | 6227654 |
| 6209989 | 6247791 | 6336710 | 6217153 | 6416167 | 6243113 |
| 6283581 | 6247790 | 6260953 | 6267469 | 6273544 | 6309048 |
| 6420196 | 6443558 | 6439689 | 6378989 | 6848181 | 6634735 |
| 6623101 | 6406129 | 6505916 | 6457809 | 6550895 | 6457812 |
| 6428133 | 6755509 | | | | |

BACKGROUND OF THE INVENTION

As set out in the above referenced applications/patents, the Applicant has spent a substantial amount of time and effort in developing printheads that incorporate micro electromechanical system (MEMS)—based components to achieve the ejection of ink necessary for printing.

As a result of the Applicant's research and development, the Applicant has been able to develop printheads having one or more printhead chips that together incorporate up to 84 000 nozzle arrangements. The Applicant has also developed suitable processor technology that is capable of controlling operation of such printheads. In particular, the processor technology and the printheads are capable of cooperating to generate resolutions of 1600 dpi and higher in some cases. Examples of suitable processor technology are provided in the above referenced patent applications/patents.

The Applicant has overcome substantial difficulties in achieving the necessary ink flow and ink drop separation within the ink jet printheads.

It is generally beneficial to increase the nozzle densities on a printhead to enhance the print resolution. MEMS fabrication of the nozzles on silicon wafer allows very high nozzle density. However, the wafer is typically about 200 microns thick with the nozzle guards, ink chambers, ejection actuators and so on occupying a layer about 20 microns thick on one side. Ink supply passages must be formed through the wafer to the nozzles.

It is not practical to form the ink supply passages from the nozzle side of the wafer through to the supply side. The fabrication of other nozzle structures would require the entire supply passage to be filled with resist while the other structures were lithographically form on top. The resist subsequently needs to be stripped out of the passage. To strip a 200-micron deep passage of resist would be difficult and time consuming.

Forming the ink supply passages from the supply side of the wafer through to the nozzle side presents its own difficulties. Firstly, the precise alignment of the masking on the supply side with the ink chambers of each nozzle on the other side is difficult. At present, the best equipment available for aligning the mask have ±2 microns accuracy. Secondly, a deep etch will often deviate from a straight path because the ions in the etchant are influenced by any charged particles in the wafer. Thirdly, the plasma etchant will often track sideways along an interface between silicon wafer and dielectric material.

Misalignment of the supply passage can lead to the plasma etch contacting and damaging other components of the nozzle, for example, the drive circuitry for the ejection actuator. Furthermore, the above causes of misalignment can compound into large inaccuracies which imposes limits on the size of the nozzle structure and the spacing between nozzles. This, of course, reduces the density of nozzles and lowers the resolution.

It is an object of the present invention to provide a useful alternative to known printheads and the techniques for fabricating them. In particular the invention aims to provide a method of making printhead chips that accommodate the standard manufacturing tolerances involved while minimizing the spacing between adjacent nozzles.

SUMMARY OF THE INVENTION

According to a first aspect of the invention, there is provided an inkjet printhead comprising:

a plurality of nozzles, a plurality of liquid passages leading to each nozzle respectively for providing ejectable liquid to the associated the nozzle;

droplet ejection actuators and associated drive circuitry corresponding to each nozzle respectively, and;

the nozzles, ejection actuators, associated drive circuitry and liquid passage being formed on and through a wafer using lithographically masked etching techniques; wherein, the wafer having a droplet ejection side and a liquid supply side; such that, each of the liquid passages is formed by etching a hole partially through the wafer from the droplet ejection side, and etching a passage from the liquid supply side of the wafer to the hole.

Etching a hole into the wafer from the droplet ejection side means the ink supply passage can stop short of the interface between the dielectric and the wafer. The plasma does not get the opportunity to track along the interface and damage the drive semiconductors. As the hole etched from the ejection side is relatively shallow, the removal of the resist is not overly difficult. This permits a more compact overall design and higher nozzle packing density.

The term 'width' when used in the context of defining the supply passage or the hole etched from the droplet ejection side, does not imply any particular geometry for these features. They may have a substantially circular cross section, in which case the width is the diameter. The passage and hole may have a substantially square cross section wherein the width might conveniently be the length of a side. However, it will be appreciated that the width may be any appropriate transverse dimension of the passage and the hole.

According to a second aspect, the present invention provides a method of ejecting drops of an ejectable liquid from an inkjet printhead, the printhead comprising a plurality of nozzles, a plurality of liquid passages leading to each nozzle respectively, droplet ejection actuators and associated drive circuitry corresponding to each nozzle respectively, the nozzles, ejection actuators, associated drive circuitry and liquid passage being formed from an etched silicon wafer using lithographic fabrication techniques, such that the wafer has a droplet ejection side and a liquid supply side, and, each of the liquid passages is formed by etching a hole partially through the wafer from the droplet ejection side, subsequently filling the hole with resist then etching a passage from the liquid supply side of the wafer to the resist before stripping the resist from the hole, the method of ejecting drops comprising the steps of:

providing the ejectable liquid to each of the nozzles using the associated liquid passage; and actuating the droplet ejection actuator to eject droplets of the ejectable liquid from the nozzle.

According to a third aspect, the present invention provides a method of fabricating inkjet printheads, the printhead comprising a plurality of nozzles, a plurality of liquid passages leading to each nozzle respectively for providing ejectable liquid to the associated the nozzle, droplet ejection actuators and associated drive circuitry corresponding to each nozzle respectively, the method comprising the steps of:

forming the nozzles, ejection actuators, associated drive circuitry and liquid passage from an etched silicon wafer using lithographic fabrication techniques, so that the wafer has a droplet ejection side and a liquid supply side; and, forming each of the liquid passages by etching a hole partially through the wafer from the droplet ejection side;

filling the hole with resist;

etching a passage from the liquid supply side of the wafer to the resist; and, stripping the resist from the hole.

According to a fourth aspect, the present invention provides a printer system incorporating an inkjet printhead comprising:

a plurality of nozzles, a plurality of liquid passages leading to each nozzle respectively for providing ejectable liquid to the associated the nozzle;

droplet ejection actuators and associated drive circuitry corresponding to each nozzle respectively, and;

the nozzles, ejection actuators, associated drive circuitry and liquid passage being formed from an etched silicon wafer using lithographic fabrication techniques; wherein, the wafer having a droplet ejection side and a liquid supply side; such that, each of the liquid passages is formed by etching a hole partially through the wafer from the droplet ejection side, subsequently filling the hole with resist then etching a passage from the liquid supply side of the wafer to the resist before stripping the resist from the hole.

Preferably, the width of the hole is greater than 8 microns but less than 24 microns. In a particularly preferred form, the width of the supply passage is greater than 10 microns. However, it is also preferable that the width of the supply passage is less than 28 microns.

Preferably, the droplet ejection actuators are thermal bend actuators. In other preferred forms, the droplet ejection actuators are gas bubble generating heater elements.

In a related aspect, the present invention provides a fluid ejection chip for a fluid ejection device, the fluid ejection chip comprising

- a substrate; and
- a plurality of nozzle arrangements that are positioned on the substrate, each nozzle arrangement comprising
  - a nozzle chamber defining structure positioned on the substrate to define a nozzle chamber;
  - an active fluid-ejecting structure that is operatively positioned with respect to the nozzle chamber and is displaceable with respect to the substrate to eject fluid from the nozzle chamber; and
  - at least two actuators that are operatively arranged with respect to the active fluid-ejecting structure to displace the active fluid-ejecting structure towards and away from the substrate, the actuators being configured and connected to the active fluid-ejecting structure to impart substantially rectilinear movement to the active fluid-ejecting structure.

The fluid ejection chip may be the product of an integrated circuit fabrication technique. Thus, the substrate may incorporate CMOS drive circuitry, each actuator being connected to the CMOS drive circuitry.

Each nozzle chamber defining structure may include a static fluid-ejecting structure and the active fluid-ejecting structure, with the active fluid-ejecting structure defining a roof with a fluid ejection port defined in the roof, so that the static and active fluid-ejecting structures define the nozzle chamber and the displacement of the active fluid-ejecting structure results in the ejection of fluid from the fluid ejection port.

A number of actuators may be positioned in a substantially rotationally symmetric manner about each active fluid-ejecting structure.

Each nozzle arrangement may include a pair of substantially identical actuators, one actuator positioned on each of a pair of opposed sides of the active fluid-ejecting structure.

Each active fluid-ejecting structure may include sidewalls that depend from the roof. The sidewalls may be dimensioned to bound the corresponding static fluid-ejecting structure.

Each static fluid-ejecting structure may define a fluid displacement formation that is spaced from the substrate and faces the roof of the active fluid-ejecting structure. Each fluid displacement formation may define a fluid displacement area that is dimensioned to facilitate ejection of fluid from the fluid ejection port, when the active fluid-ejecting structure is displaced towards the substrate.

The substrate may define a plurality of fluid inlet channels, one fluid inlet channel opening into each respective nozzle chamber at a fluid inlet opening.

The fluid inlet channel of each nozzle arrangement may open into the nozzle chamber in substantial alignment with the fluid ejection port. Each static fluid-ejecting structure may be positioned about a respective fluid inlet opening.

Each actuator may be in the form of a thermal bend actuator. Each thermal bend actuator may be anchored to the substrate at one end and movable with respect to the substrate at an opposed end. Further, each thermal bend actuator may have an actuator arm that bends when differential thermal expansion is set up in the actuator arm. Each thermal bend actuator may be connected to the CMOS drive circuitry to bend towards the substrate when the thermal bend actuator receives a driving signal from the CMOS drive circuitry.

Each nozzle arrangement may include at least two coupling structures. One coupling structure being positioned intermediate each actuator and the respective active fluid-ejecting structure. Each coupling structure may be configured to accommodate both arcuate movement of said opposed end of each thermal bend actuator and said substantially rectilinear movement of the active fluid-ejecting structure.

Each active fluid-ejecting structure and each static fluid-ejecting structure may be shaped so that, when fluid is received in the nozzle chamber, the fluid-ejecting structures and the fluid define a fluidic seal to inhibit fluid from leaking out of the nozzle chamber between the fluid-ejecting structures.

The invention extends to a fluid ejection device that includes at least one fluid ejection chip as described above.

The invention is now described, by way of example, with reference to the accompanying drawings. The following description is not intended to limit the broad scope of the above summary or the broad scope of the appended claims. Still further, for purposes of convenience, the following description is directed to a printhead chip. However, it will be appreciated that the invention is applicable to a wider range of devices, which Applicant has referred to generically as a "fluid ejection chip".

DETAILED DESCRIPTION OF THE INVENTION

The present invention is applicable to printheads formed on and through silicon wafers by lithographic etching and deposition techniques, regardless of whether bubble forming heater elements or thermal bend actuators are used.

Bubble Forming Heater Element Actuated Printheads

Figure 1:
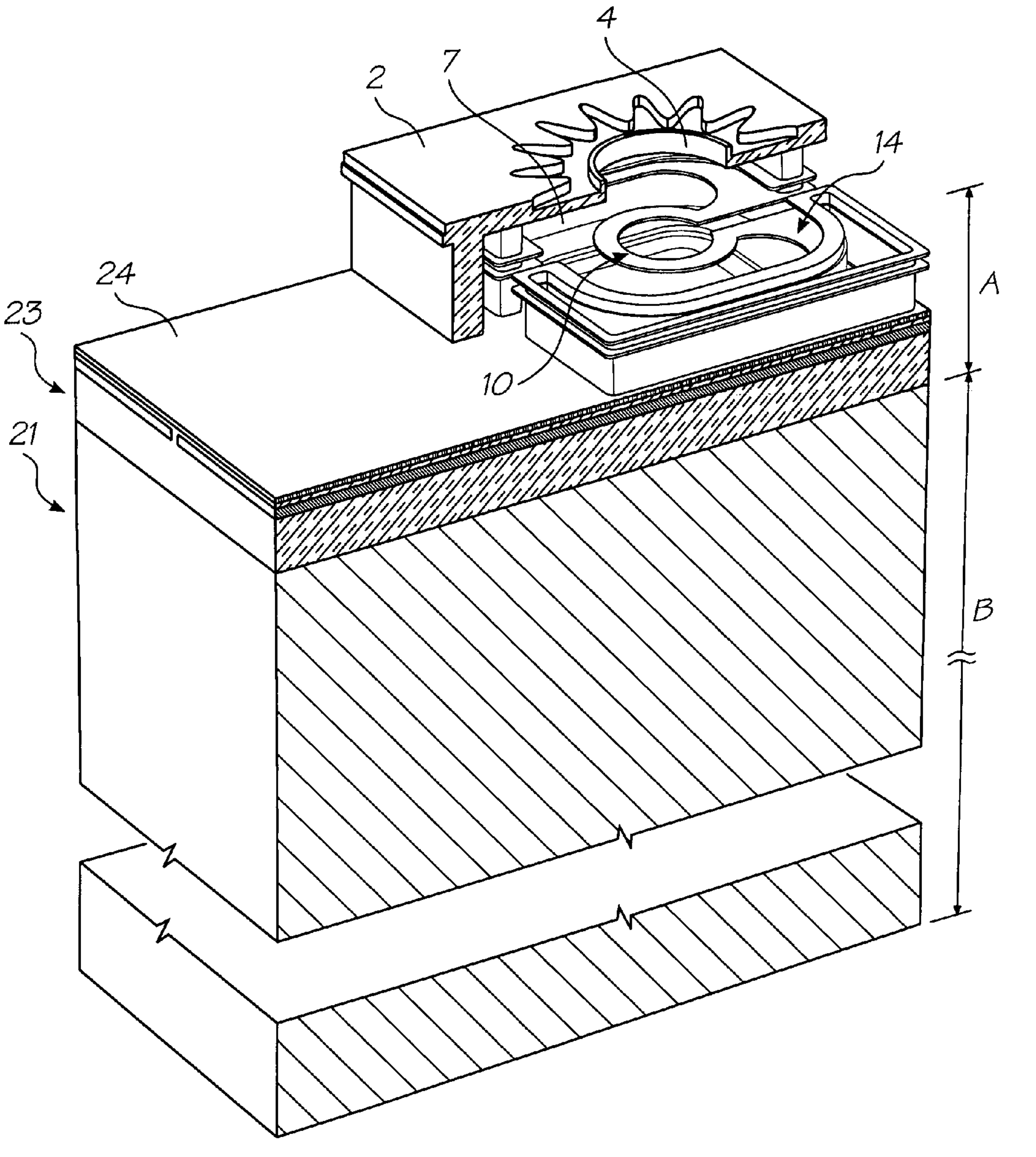
FIG. 1 is a schematic perspective view, partially cut away, of a unit cell of a printhead according to the invention.

FIG. 1 shows a nozzle of this type. The nozzles, ejection actuators, associated drive circuitry and ink supply passages are formed on and through a wafer using lithographically masked etching techniques described in great detail in U.S. Ser. No. 10/302,274. In the interests of brevity, the disclosure of the '274 application is incorporated herein in its entirety. For convenience, the reference numerals on FIGS. 1 to 7 accord with the reference numbering used in '274. Corresponding features of the embodiments shown in FIGS. 8 to 20 do not necessarily use the same reference numerals.

The unit cell 1 is shown with part of the walls 6 and nozzle plate 2 cut-away, which reveals the interior of the chamber 7. The heater 14 is not shown cut away, so that both halves of the heater element 10 can be seen.

In operation, ink 11 passes through the ink inlet passage 31 (see FIGS. 2–7) to fill the chamber 7. Then a voltage is applied across the electrodes 15 to establish a flow of electric current through the heater element 10. This heats the element 10, to form a vapor bubble in the ink within the chamber 7 to eject a drop of ink.

It is generally beneficial to increase the nozzle densities on a printhead to enhance the print resolution. MEMS fabrication of the nozzles on silicon wafer allows very high nozzle density. However, the wafer is typically about 200 microns thick with the nozzle guards, ink chambers, ejection actuators and so on occupying a layer about 20 microns thick on one side. These dimensions are indicated generally by A and B on FIG. 1.

FIGS. 2 to 7 show the unit cell with the ink chamber 7 and heater element 10 removed for clarity. Ink is supplied to the chambers by passages 32 extending to the opposite side of the wafer. It would be convenient to etch these passages 32 from the nozzle side of the wafer as this side will be subject to etching and deposition to form the nozzle structures. Unfortunately, it is not practical to form the ink supply passages from the nozzle side of the wafer. The entire supply passage 32 would have to be filled with resist while the nozzle structures were lithographically formed. Stripping the resist out of a 200-micron deep passage of resist would be prohibitively difficult and time consuming.

Forming the ink supply passages from the supply side of the wafer through to the nozzle side presents its own difficulties. These problems are schematically illustrated in FIGS. 2, 3 and 4.

Figure 2:
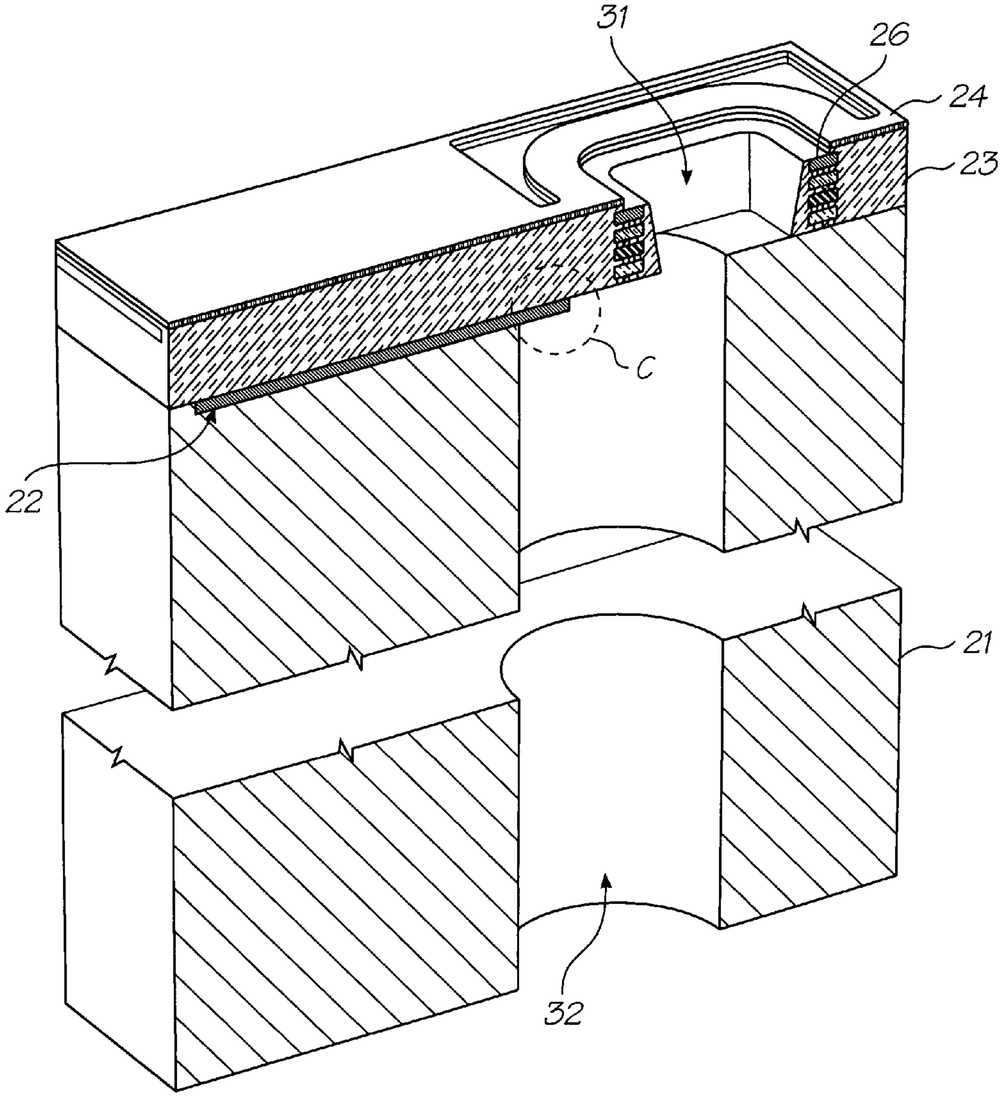
FIG. 2 shows a schematic, sectioned perspective of a unit cell of the type shown in FIG. 1, at an intermediate stage of its fabrication.

Referring to FIG. 2, the ink supply passage is etched through the wafer 21 to the CMOS metallisation layers of the interconnect 23. The inlet 31 in the interconnect 23 provides a fluid connection between the supply passage 32 and the nozzle chamber (not shown) to be formed on the passivation layer 24. Guard rings 26 prevent ink from diffusing from within the inlet 31 to the wiring in the interconnect 23 and the CMOS drive circuitry 22 between the wafer substrate 21 and the interconnect 23. Unfortunately, the precise alignment of the masking on the supply side of the wafer with the ink chambers of each nozzle on the nozzle side is difficult. At present, the best equipment available for aligning the mask has ±2 microns accuracy. If the drive circuitry 22 is too close to the inlet 31, a portion C of the circuitry 22 risks damage by the etchant due to misalignment of the passage 32.

Figure 3:
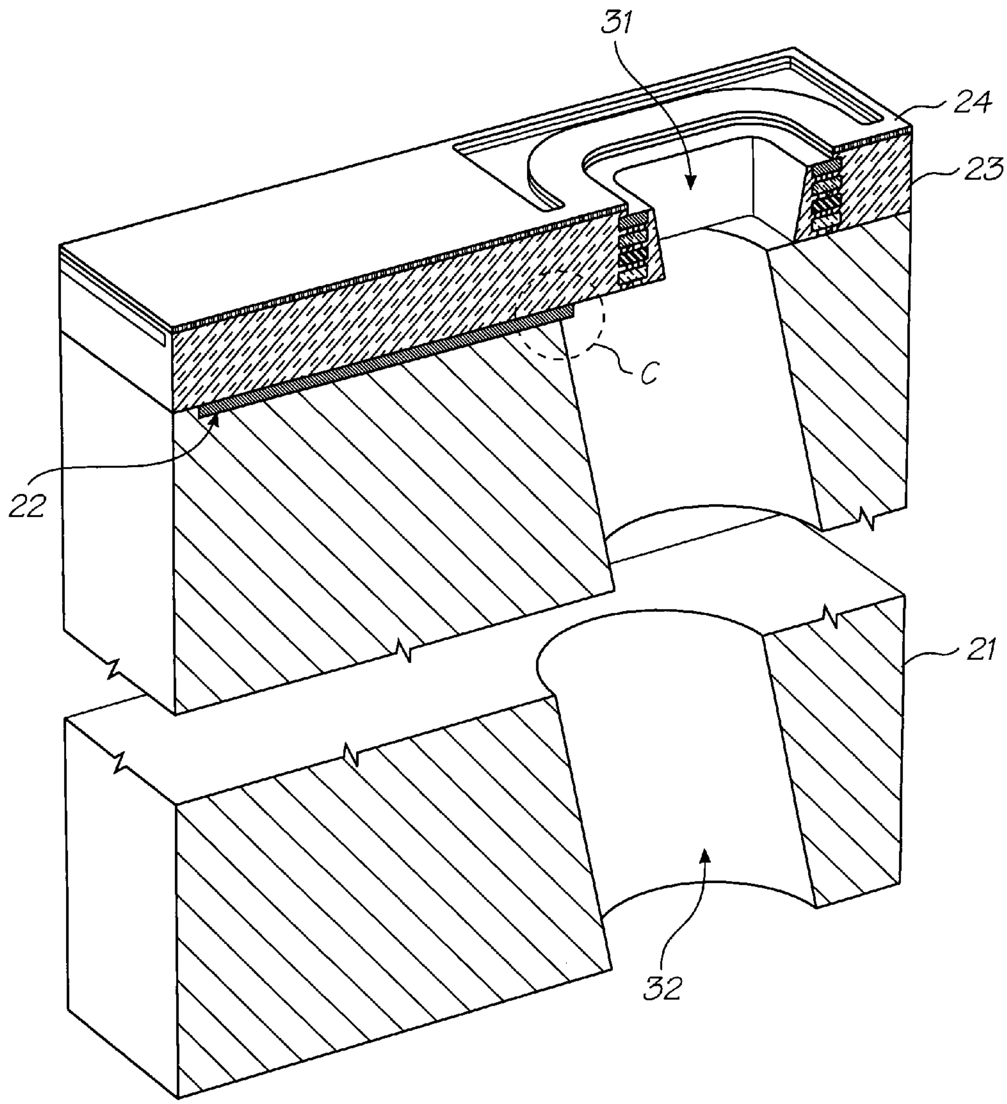
FIG. 3 shows a schematic, sectioned perspective of a unit cell of the type shown in FIG. 1, at an intermediate stage of its fabrication.

Another problem is schematically shown in FIG. 3. A deep etch will often deviate from a straight path. Ions in the etchant are influenced by any charged particles in the wafer 21. While the mask may be perfectly aligned on the supply side of the wafer 21, the deep etch is slightly angled and can result in a significant misalignment at the interface of the wafer 21 and the interconnect 23. Again, if the drive circuitry 22 is too close, a portion C may be destroyed by the oxygen plasma etchant.

Figure 4:
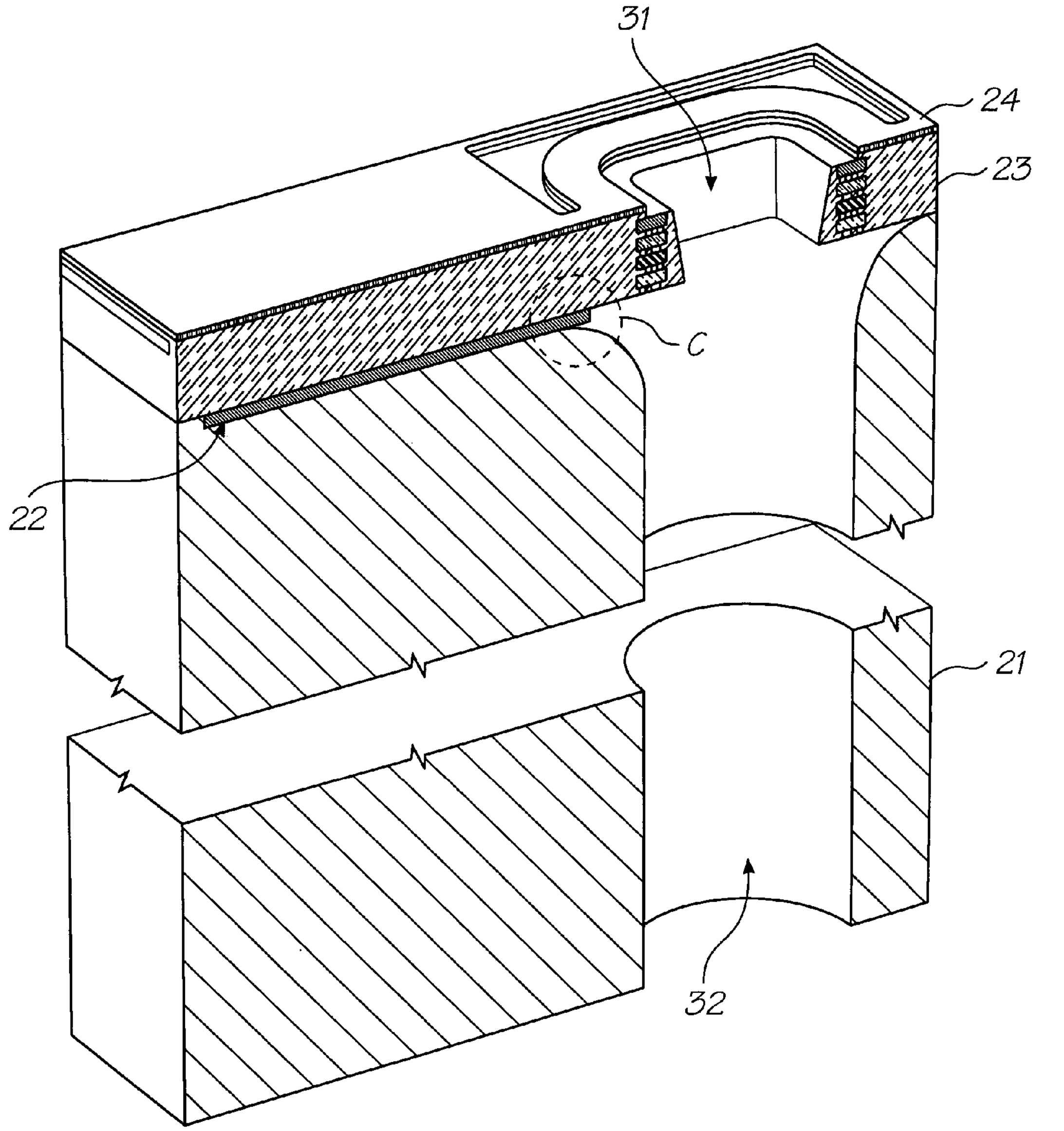
FIG. 4 shows a schematic, sectioned perspective of a unit cell of the type shown in FIG. 1, at an intermediate stage of its fabrication.

FIG. 4 illustrates another potential problem. The plasma etchant will often track sideways along an interface between silicon wafer 21 and dielectric material of the interconnect 23. Once again, this can lead to inadvertent etching of the drive circuitry 22.

The above causes of misalignment can compound into large inaccuracies that imposes limits on the size of the nozzle structure and the spacing between nozzles. This, of course, reduces the density of nozzles and lowers the resolution.

Figure 5:
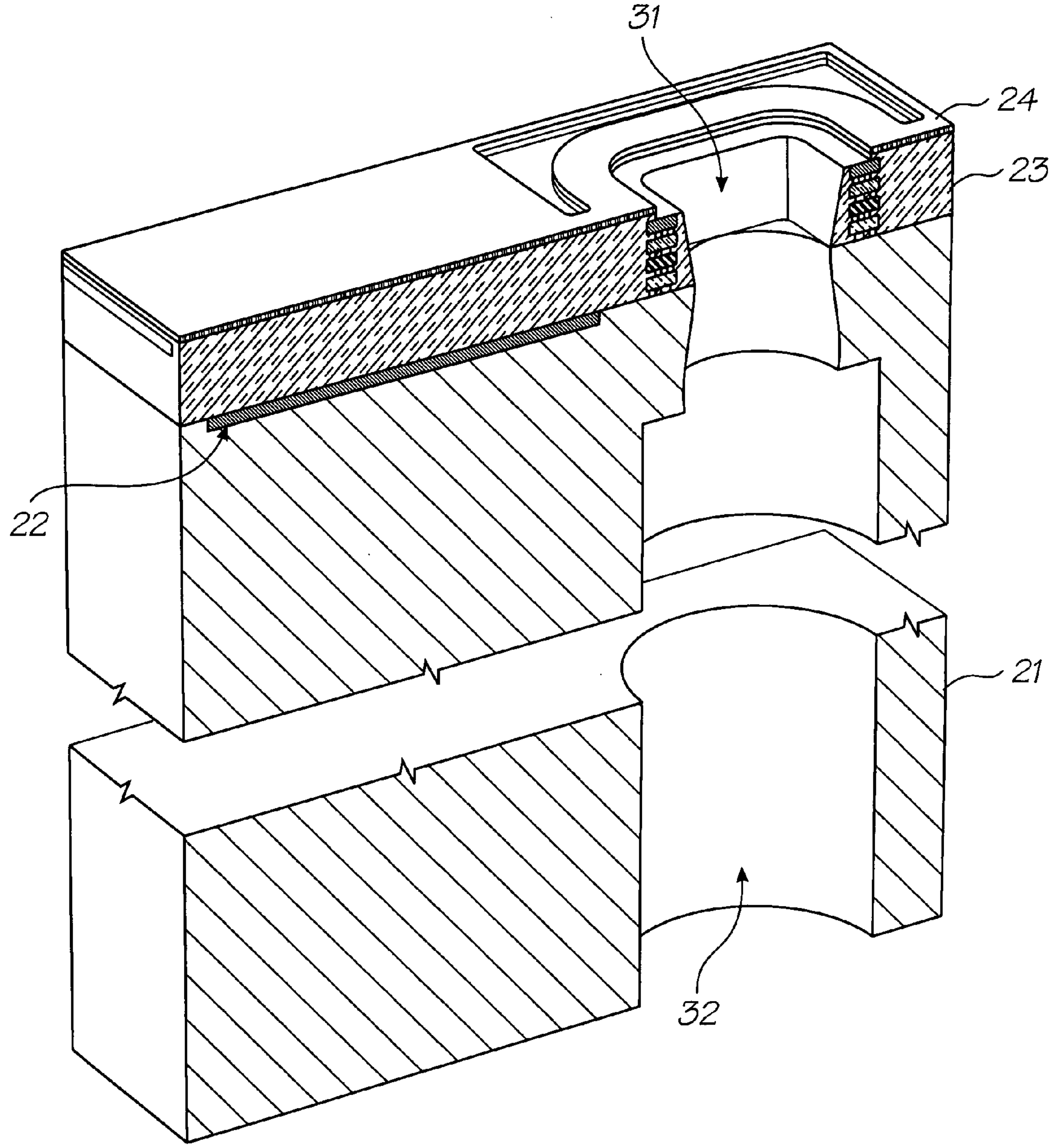
FIG. 5 shows a schematic, sectioned perspective of the unit cell shown in FIG. 1, at an intermediate stage of its fabrication in accordance with the present invention.
Figure 6:
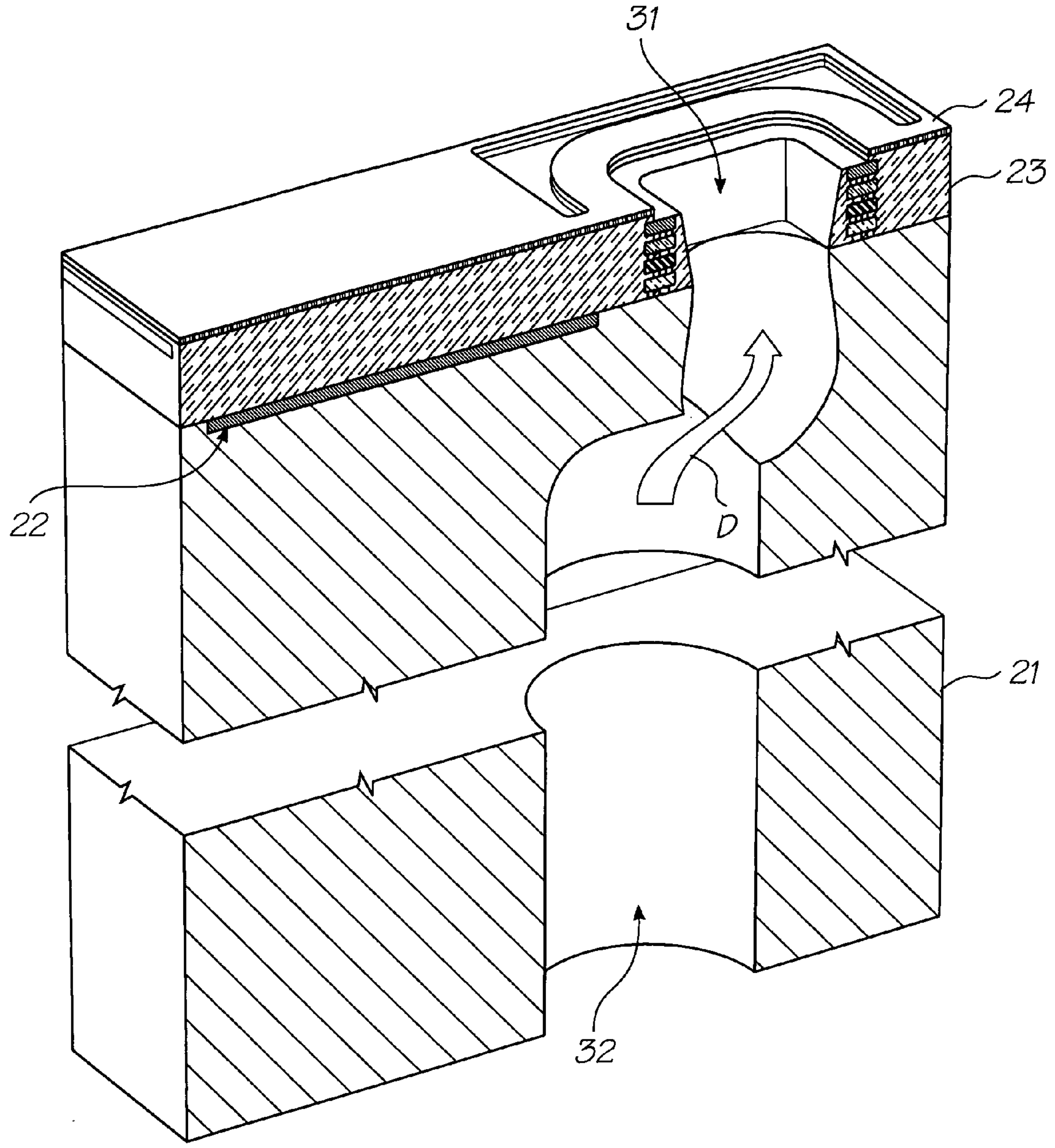
FIG. 6 shows a schematic, sectioned perspective of the unit cell shown in FIG. 1, at an intermediate stage of its fabrication in accordance with the present invention.
Figure 7:
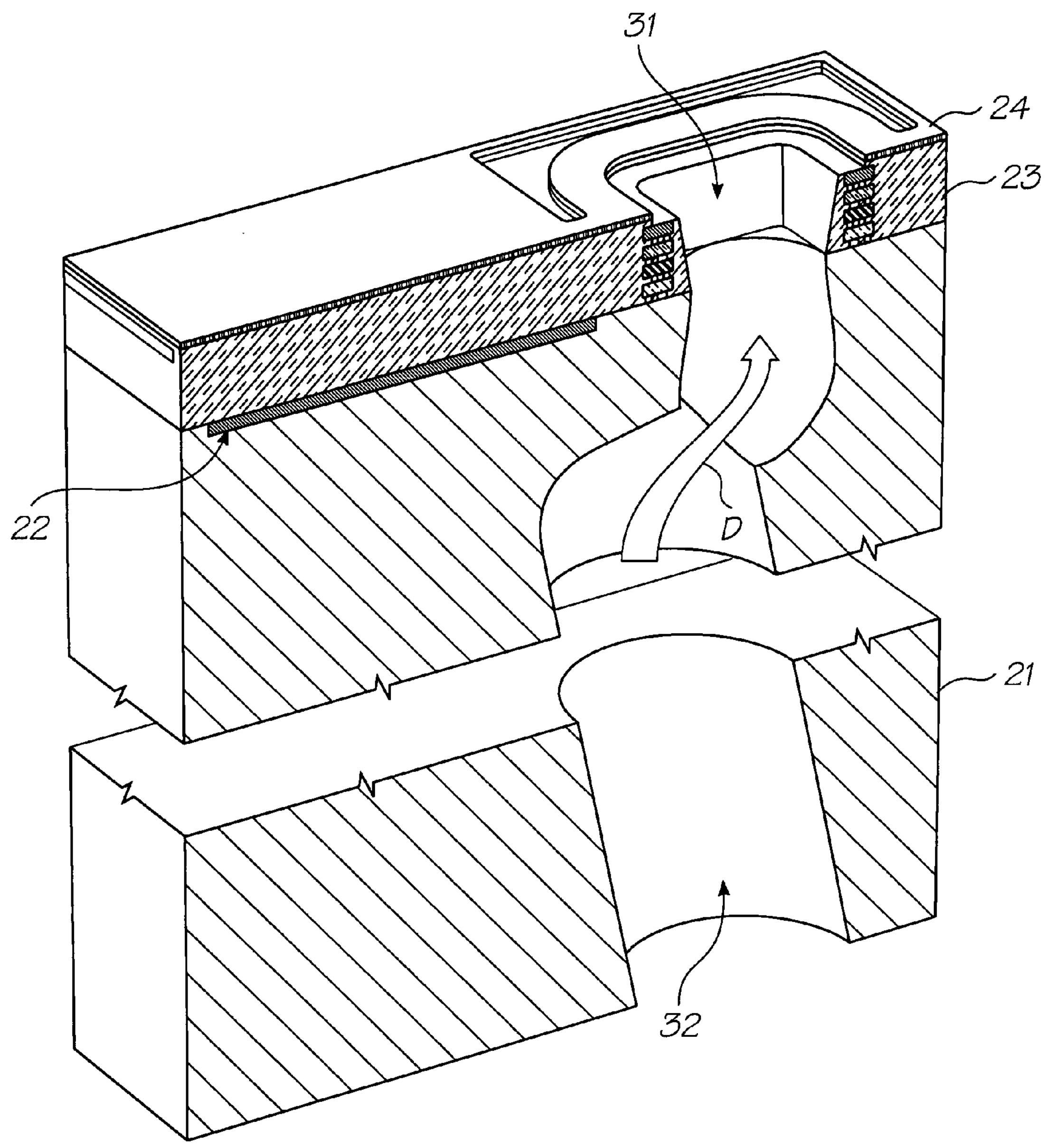
FIG. 7 shows a schematic, sectioned perspective of the unit cell shown in FIG. 1, at an intermediate stage of its fabrication in accordance with the present invention.
Figure 8:
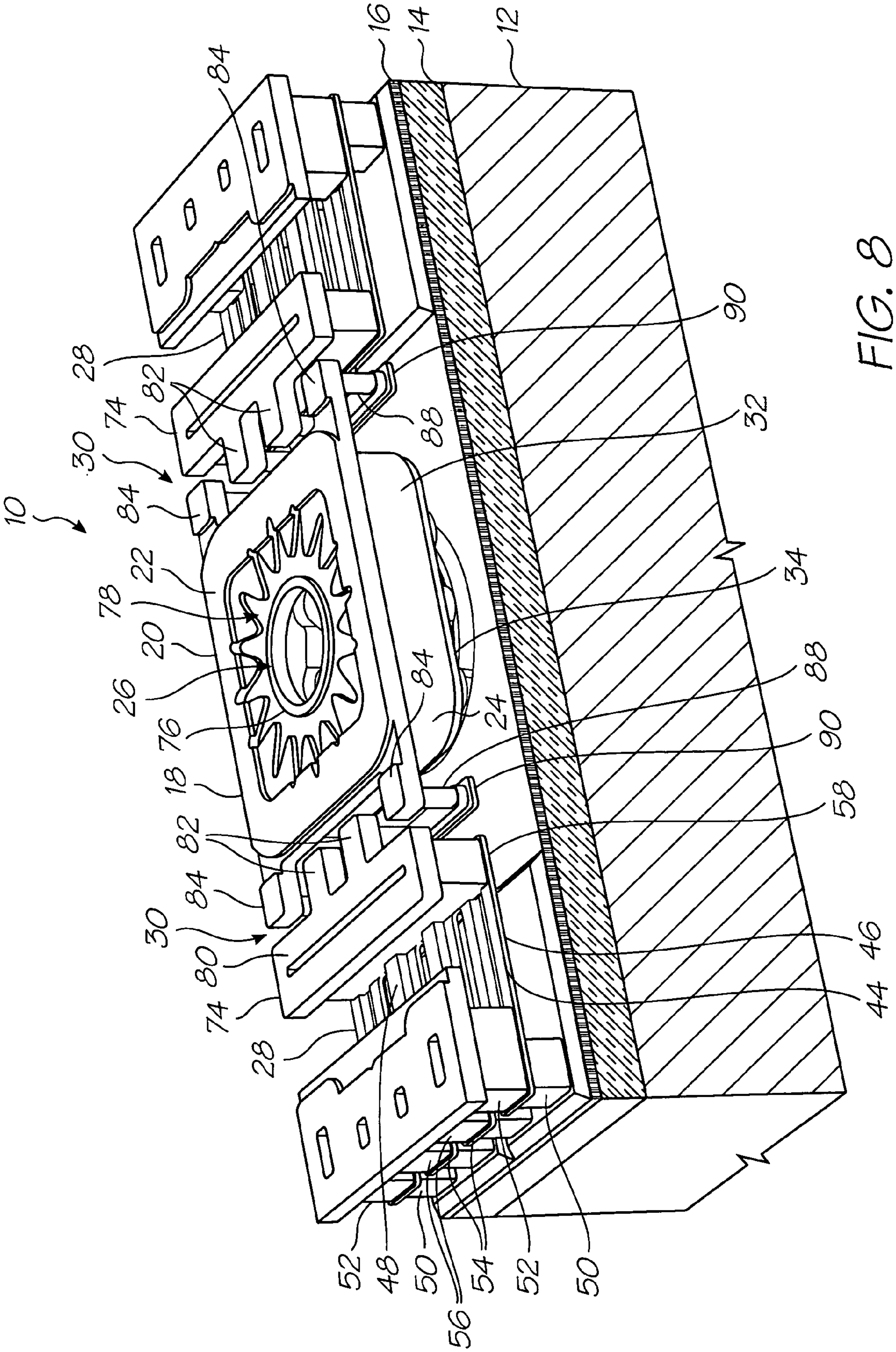
FIG. 8 shows a three-dimensional view of a nozzle arrangement of a thermal bend actuator embodiment of a printhead chip in accordance with the invention, for an ink jet printhead.
Figure 9:
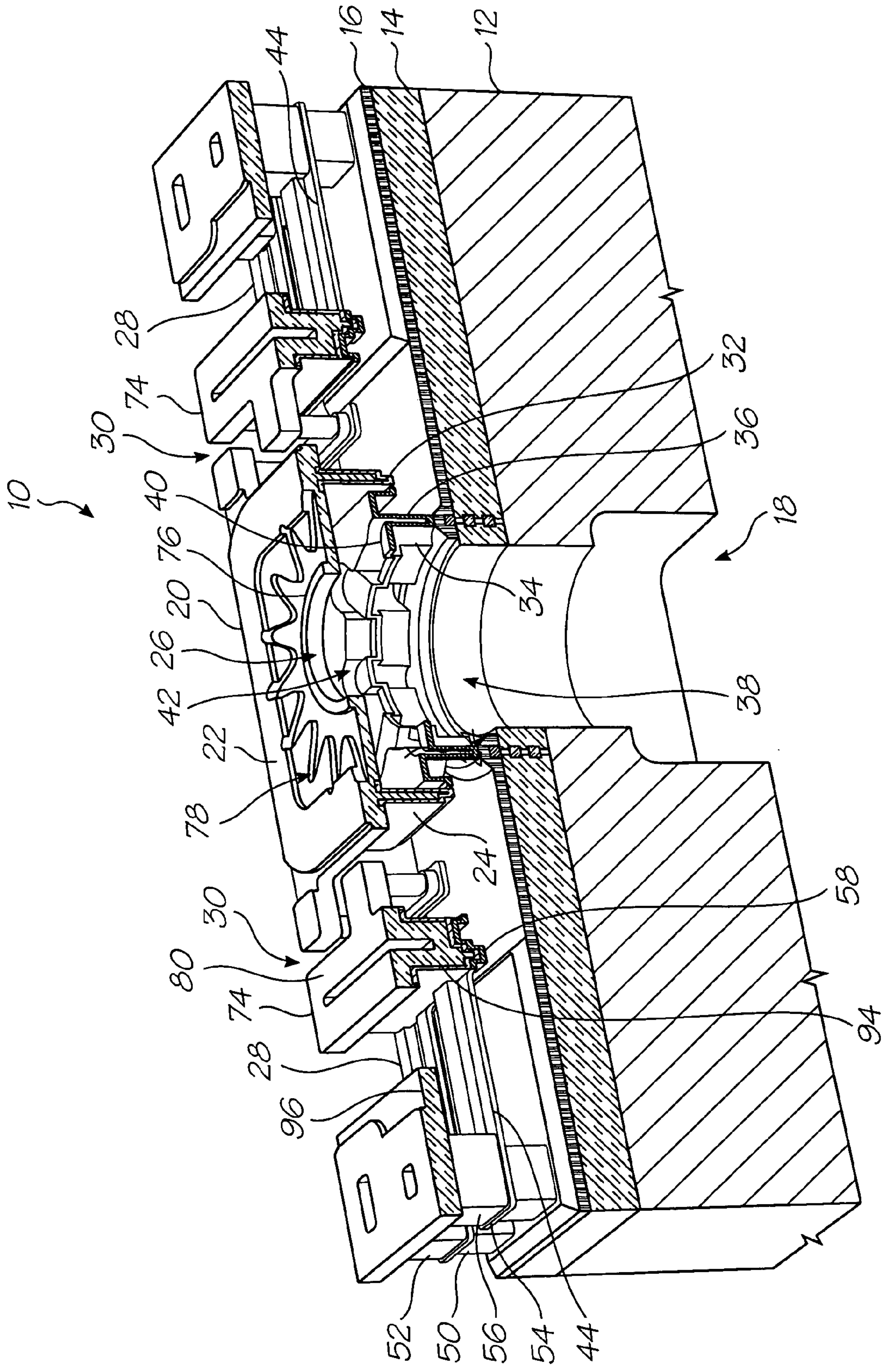
FIG. 9 shows a three-dimensional sectioned view of the nozzle arrangement of FIG. 8.
Figure 10:
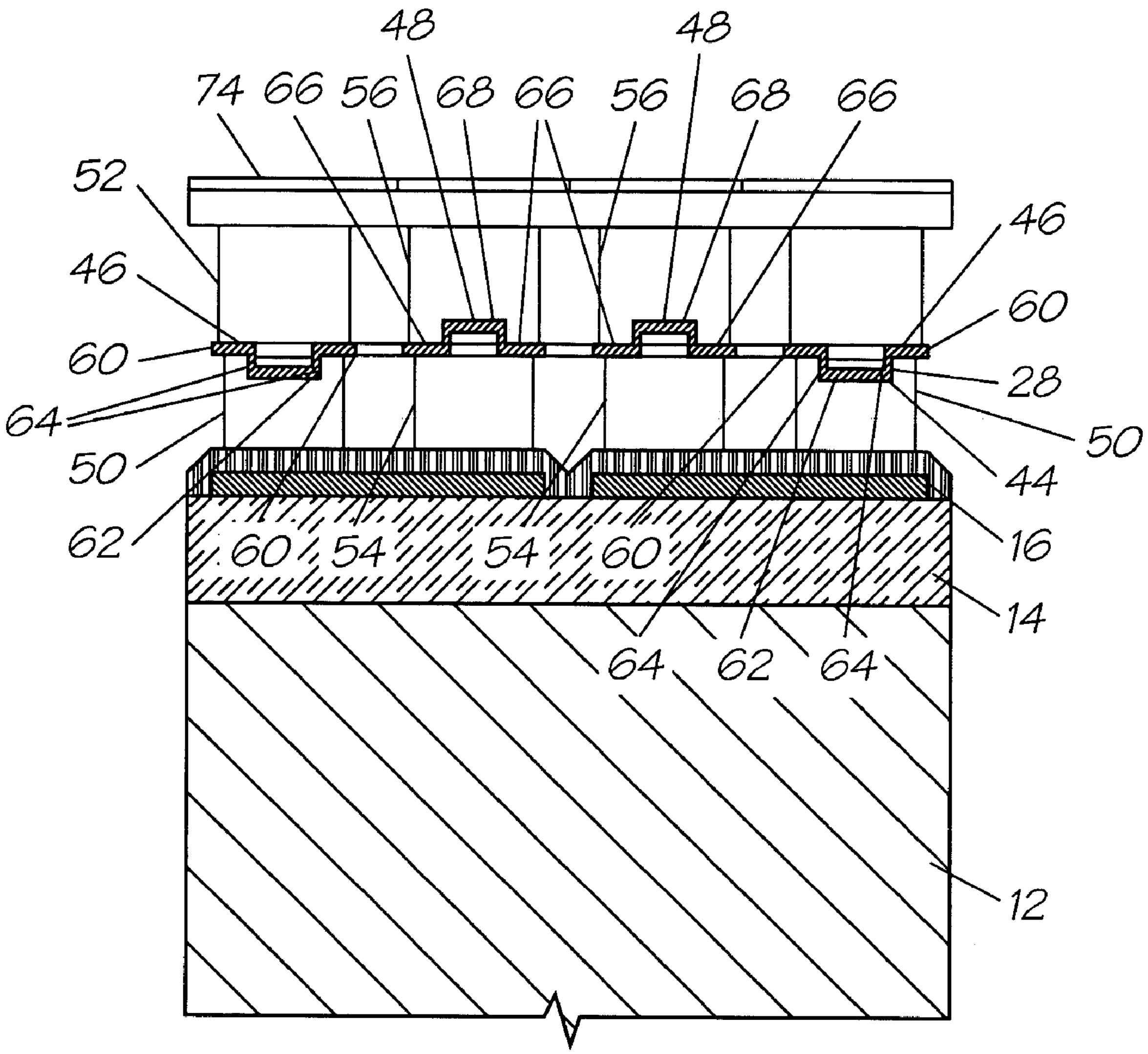
FIG. 10 shows a transverse cross sectional view of a thermal bend actuator of the nozzle arrangement of FIG. 8.
Figure 11:
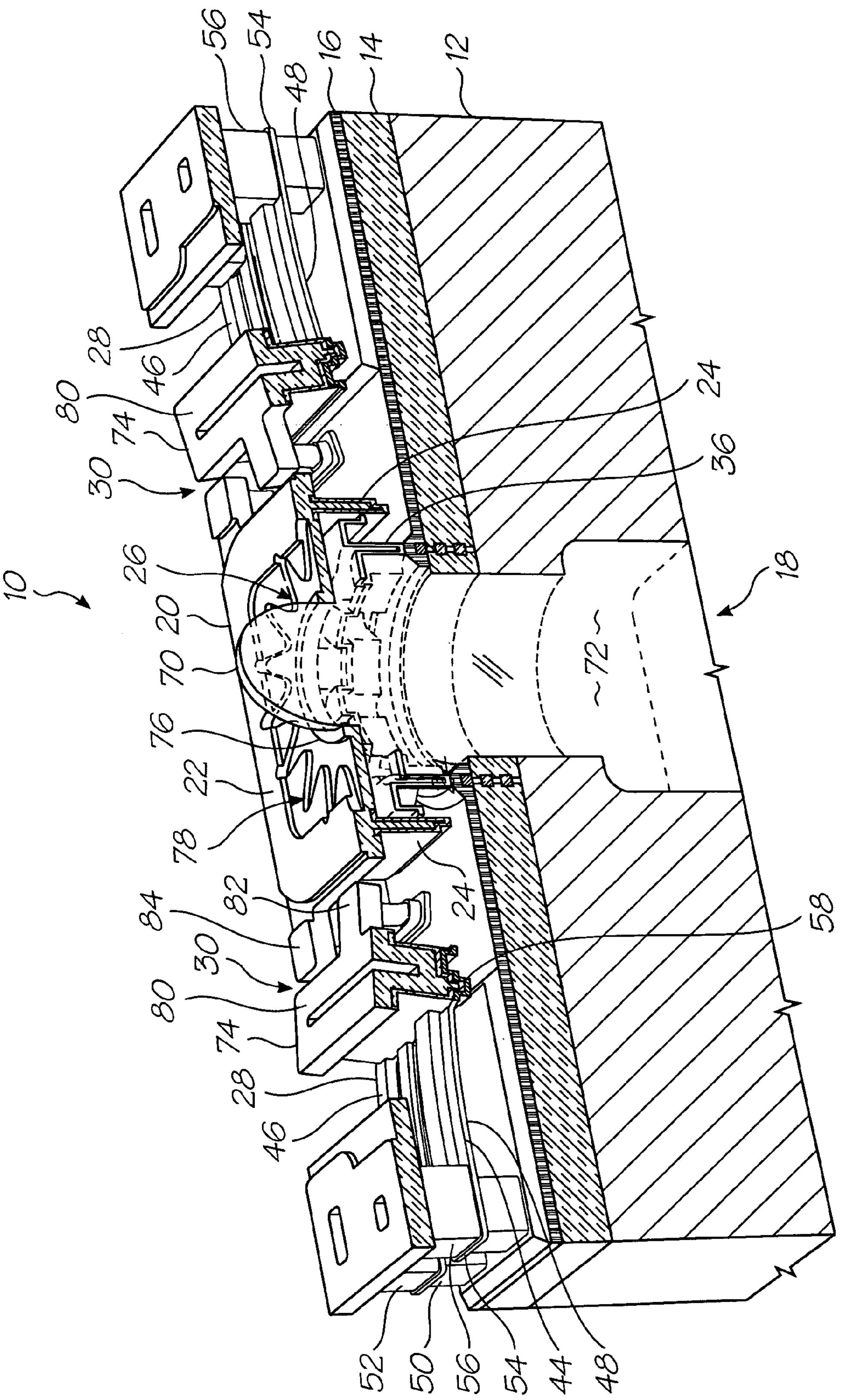
FIG. 11 shows a three-dimensional sectioned view of the nozzle arrangement of FIG. 8, in an initial stage of ink drop ejection.
Figure 12:
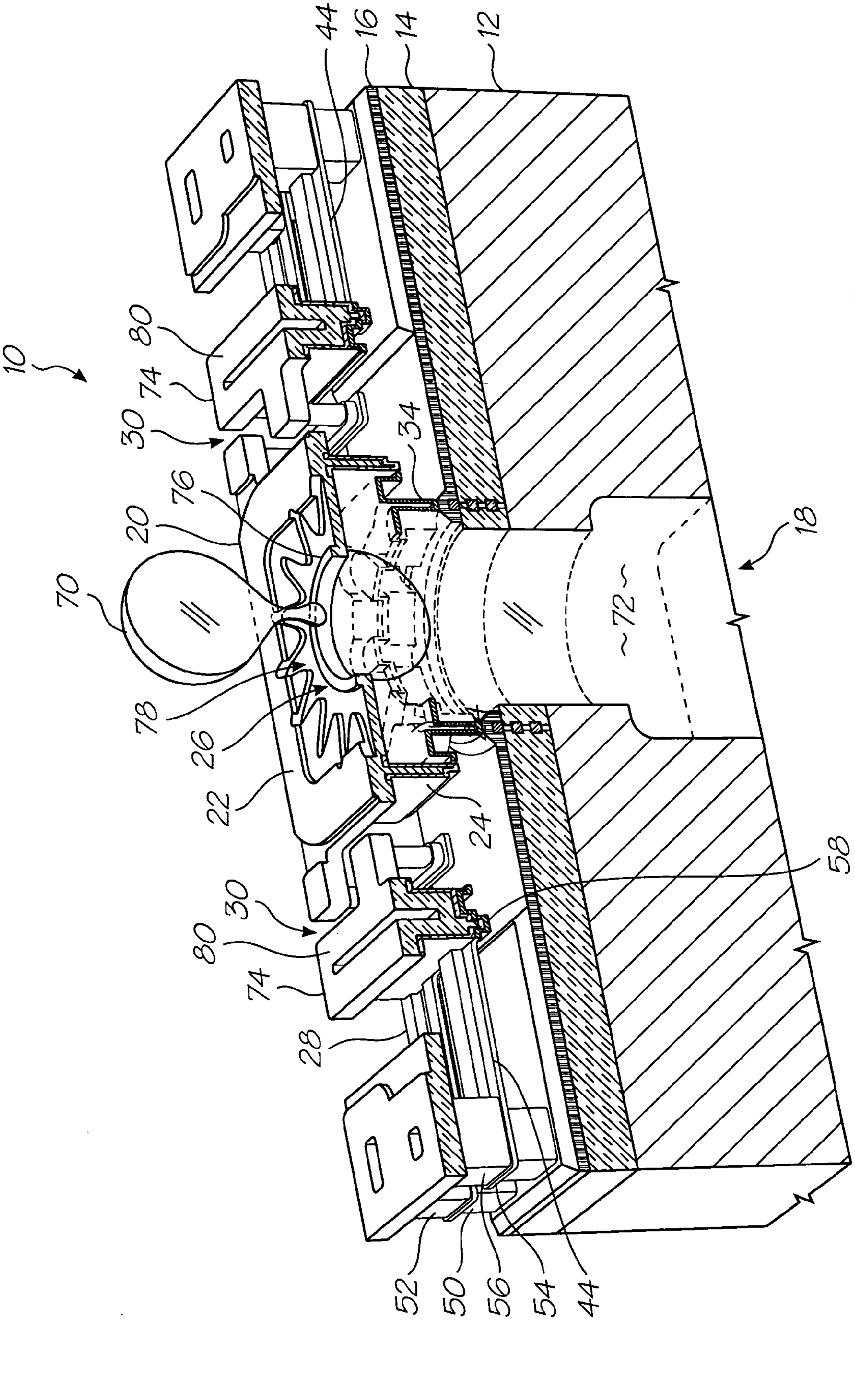
FIG. 12 shows a three-dimensional sectioned view of the nozzle arrangement of FIG. 8, in a terminal stage of ink drop ejection.

Referring to 5, 6 and 7, the present invention addresses this by etching the inlet 31 through the interconnect 23 and into the wafer 21 so that the ink supply passage 32 can stop short of the interface between the dielectric 23 and the wafer 21. As best shown in FIG. 5, the plasma does not get the opportunity to track along the interface and damage the CMOS drive circuitry. As the inlet hole 31 is relatively shallow, the removal of the resist is not overly difficult. This permits a more compact overall design and higher nozzle packing density. Using this technique, the sizes of the ink conduits are also relative small. Typically, the width of the inlet hole 31 is between 8 microns and 24 microns, and the width of the supply passage 32 is between 10 microns and 28 microns.

Thermal Bend Actuated Printheads

In FIGS. 8 to 12, reference numeral 10 generally indicates a nozzle arrangement of a printhead chip, for an ink jet printhead in accordance with a related aspect of the invention.

The nozzle arrangement 10 is one of a plurality of such nozzle arrangements formed on a silicon wafer substrate 12 to define the printhead chip of the invention. As set out in the background of this specification, a single printhead can contain up to 84 000 such nozzle arrangements. For the purposes of clarity and ease of description, only one nozzle arrangement is described. It is to be appreciated that a person of ordinary skill in the field can readily obtain the printhead chip by simply replicating the nozzle arrangement 10 on the wafer substrate 12.

The printhead chip is the product of an integrated circuit fabrication technique. In particular, each nozzle arrangement 10 is the product of a MEMS—based fabrication technique. As is known, such a fabrication technique involves the deposition of functional layers and sacrificial layers of integrated circuit materials. The functional layers are etched to define various moving components and the sacrificial layers are etched away to release the components. As is known, such fabrication techniques generally involve the replication of a large number of similar components on a single wafer that is subsequently diced to separate the various components from each other. This reinforces the submission that a person of ordinary skill in the field can readily obtain the printhead chip of this invention by replicating the nozzle arrangement 10.

An electrical drive circuitry layer 14 is positioned on the silicon wafer substrate 12. The electrical drive circuitry layer 14 includes CMOS drive circuitry. The particular configuration of the CMOS drive circuitry is not important to this description and has therefore not been shown in any detail in the drawings. Suffice to say that it is connected to a suitable microprocessor and provides electrical current to the nozzle arrangement 10 upon receipt of an enabling signal from said suitable microprocessor. An example of a suitable microprocessor is described in the above referenced patents/patent applications. It follows that this level of detail will not be set out in this specification.

An ink passivation layer 16 is positioned on the drive circuitry layer 14. The ink passivation layer 16 can be of any suitable material, such as silicon nitride.

The nozzle arrangement 10 includes an ink inlet channel 18 that is one of a plurality of such ink inlet channels defined in the substrate 12.

The nozzle arrangement 10 includes an active ink ejection structure 20. The active ink ejection structure 20 has a roof 22 and sidewalls 24 that depend from the roof 22. An ink ejection port 26 is defined in the roof 22.

The active ink ejection structure 20 is connected to, and between, a pair of thermal bend actuators 28 with coupling structures 30 that are described in further detail below. The roof 22 is generally rectangular in plan and, more particularly, can be square in plan. This is simply to facilitate connection of the actuators 28 to the roof 22 and is not critical. For example, in the event that three actuators are provided, the roof 22 could be generally triangular in plan. There may thus be other shapes that are suitable.

The active ink ejection structure 20 is connected between the thermal bend actuators 28 so that a free edge 32 of the sidewalls 24 is spaced from the ink passivation layer 16. It will be appreciated that the sidewalls 24 bound a region between the roof 22 and the substrate 12.

The roof 22 is generally planar, but defines a nozzle rim 76 that bounds the ink ejection port 26. The roof 22 also defines a recess 78 positioned about the nozzle rim 76 which serves to inhibit ink spread in case of ink wetting beyond the nozzle rim 76.

The nozzle arrangement 10 includes a static ink ejection structure 34 that extends from the substrate 12 towards the roof 22 and into the region bounded by the sidewalls 24. The static ink ejection structure 34 and the active ink ejection structure 20 together define a nozzle chamber 42 in fluid communication with an opening 38 of the ink inlet channel 18. The static ink ejection structure 34 has a wall portion 36 that bounds an opening 38 of the ink inlet channel 18. An ink displacement formation 40 is positioned on the wall portion 36 and defines an ink displacement area that is sufficiently large so as to facilitate ejection of ink from the ink ejection port 26 when the active ink displacement structure 20 is displaced towards the substrate 12. The opening 38 is substantially aligned with the ink ejection port 26.

The thermal bend actuators 28 are substantially identical. It follows that, provided a similar driving signal is supplied to each thermal bend actuator 28, the thermal bend actuators 28 each produce substantially the same force on the active ink ejection structure 20.

In FIG. 3 there is shown the thermal bend actuator 28 in further detail. The thermal bend actuator 28 includes an arm 44 that has a unitary structure. The arm 44 is of an electrically conductive material that has a coefficient of thermal expansion which is such that a suitable component of such material is capable of performing work, on a MEMS scale, upon expansion and contraction of the component when heated and subsequently cooled. The material can be one of many. However, it is desirable that the material has a Young's Modulus that is such that, when the component bends through differential heating, energy stored in the component is released when the component cools to assist return of the component to a starting condition. The Applicant has found that a suitable material is Titanium Aluminum Nitride (TiAlN). However, other conductive materials may also be suitable, depending on their respective coefficients of thermal expansion and Young's Modulus.

The arm 44 has a pair of outer passive portions 46 and a pair of inner active portions 48. The outer passive portions 46 have passive anchors 50 that are each made fast with the ink passivation layer 16 by a retaining structure 52 of successive layers of titanium and silicon dioxide or equivalent material.

The inner active portions 48 have active anchors 54 that are each made fast with the drive circuitry layer 14 and are electrically connected to the drive circuitry layer 14. This is also achieved with a retaining structure 56 of successive layers of titanium and silicon dioxide or equivalent material.

The arm 44 has a working end that is defined by a bridge portion 58 that interconnects the portions 46, 48. It follows that, with the active anchors 54 connected to suitable electrical contacts in the drive circuitry layer 14, the inner active portions 48 define an electrical circuit. Further, the portions 46, 48 have a suitable electrical resistance so that the inner active portions 48 are heated when a current from the CMOS drive circuitry passes through the inner active portions 48. It will be appreciated that substantially no current will pass through the outer passive portions 46 resulting in the passive portions heating to a significantly lesser extent than the inner active portions 48. Thus, the inner active portions 48 expand to a greater extent than the outer passive portions 46.

As can be seen in FIG. 3, each outer passive portion 46 has a pair of outer horizontally extending sections 60 and a central horizontally extending section 62. The central section 62 is connected to the outer sections 60 with a pair of vertically extending sections 64 so that the central section 62 is positioned intermediate the substrate 12 and the outer sections 60.

Each inner active portion 48 has a transverse profile that is effectively an inverse of the outer passive portions 46. Thus, outer sections 66 of the inner active portions 48 are generally coplanar with the outer sections 60 of the passive portions 46 and are positioned intermediate central sections 68 of the inner active portions 48 and the substrate 12. It follows that the inner active portions 48 define a volume that is positioned further from the substrate 12 than the outer passive portions 46. It will therefore be appreciated that the greater expansion of the inner active portions 48 results in the arm 44 bending towards the substrate 12. This movement of the arms 44 is transferred to the active ink ejection structure 20 to displace the active ink ejection structure 20 towards the substrate 12.

This bending of the arms 44 and subsequent displacement of the active ink ejection structure 20 towards the substrate 12 is indicated in FIG. 4. The current supplied by the CMOS drive circuitry is such that an extent and speed of movement of the active ink displacement structure 20 causes the formation of an ink drop 70 outside of the ink ejection port 26. When the current in the inner active portions 48 is discontinued, the inner active portions 48 cool, causing the arm 44 to return to a position shown in FIG. 1. As discussed above, the material of the arm 44 is such that a release of energy built up in the passive portions 46 assists the return of the arm 44 to its starting condition. In particular, the arm 44 is configured so that the arm 44 returns to its starting position with sufficient speed to cause separation of the ink drop 70 from ink 72 within the nozzle chamber 42.

On the macroscopic scale, it would be counter-intuitive to use heat expansion and contraction of material to achieve movement of a functional component. However, the Applicant has found that, on a microscopic scale, the movement resulting from heat expansion is fast enough to permit a functional component to perform work. This is particularly so when suitable materials, such as TiAlN are selected for the functional component.

One coupling structure 30 is mounted on each bridge portion 58. As set out above, the coupling structures 30 are positioned between respective thermal actuators 28 and the roof 22. It will be appreciated that the bridge portion 58 of each thermal actuator 28 traces an arcuate path when the arm 44 is bent and straightened in the manner described above. Thus, the bridge portions 58 of the oppositely oriented actuators 28 tend to move away from each other when actuated, while the active ink ejection structure 20 maintains a rectilinear path. It follows that the coupling structures 30 should accommodate movement in two axes, in order to function effectively.

Figure 13:
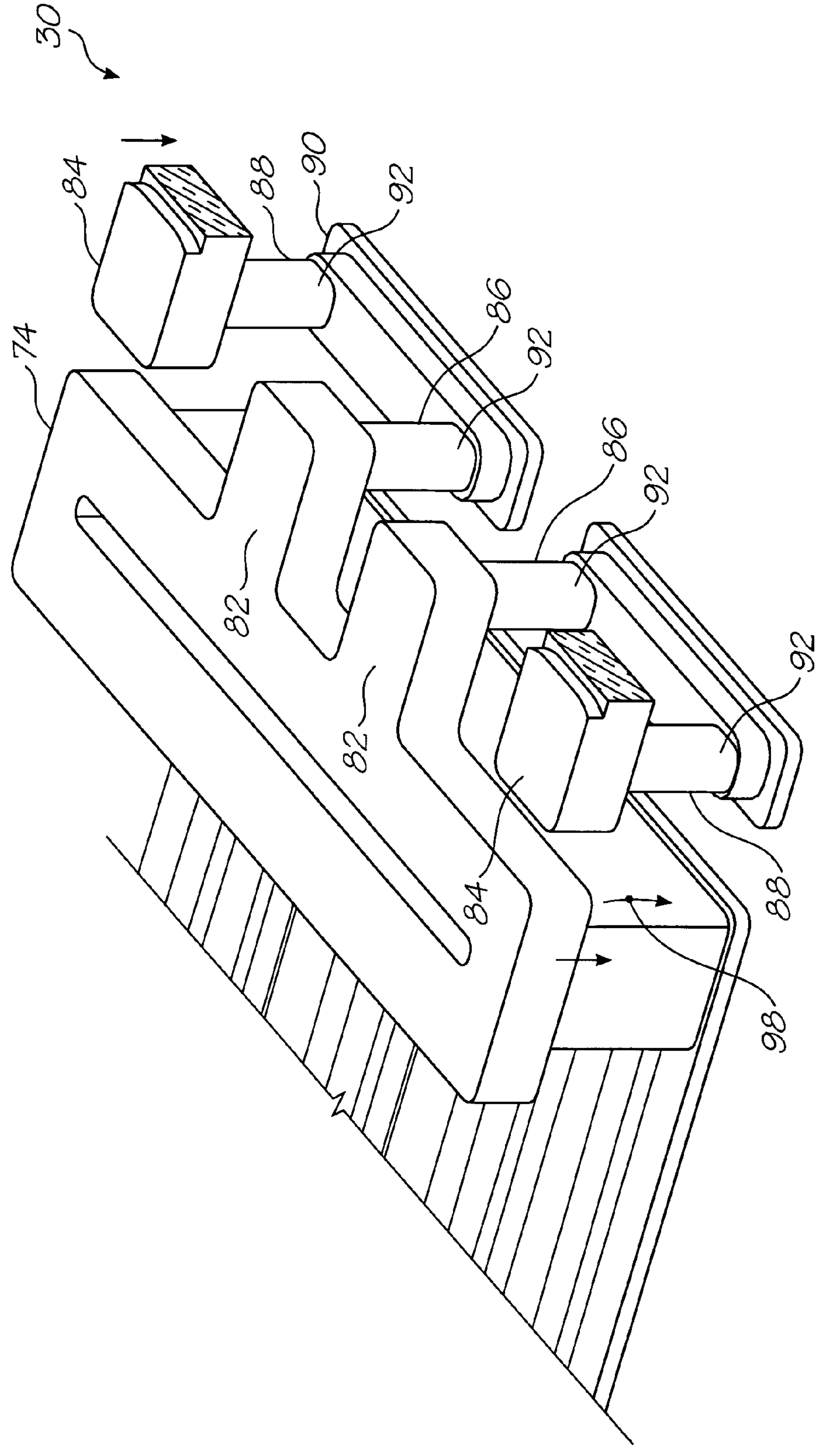
FIG. 13 shows a schematic view of one coupling structure of the nozzle arrangement of FIG. 8.
Figure 14:
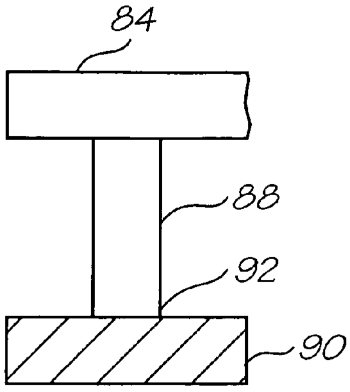
FIG. 14 shows a schematic view of a part of the coupling structure attached to an active ink ejection structure of the nozzle arrangement, when the nozzle arrangement is in a quiescent condition.

Details of one of the coupling structures 30 are shown in FIG. 13. It will be appreciated that the other coupling structure 30 is simply an inverse of that shown in FIG. 13. It follows that it is convenient to describe just one of the coupling structures 30.

The coupling structure 30 includes a connecting member 74 that is positioned on the bridge portion 58 of the thermal actuator 28. The connecting member 74 has a generally planar surface 80 that is substantially coplanar with the roof 22 when the nozzle arrangement 10 is in a quiescent condition.

A pair of spaced proximal tongues 82 is positioned on the connecting member 74 to extend towards the roof 22. Likewise, a pair of spaced distal tongues 84 is positioned on the roof 22 to extend towards the connecting member 74 so that the tongues 82, 84 overlap in a common plane parallel to the substrate 12. The tongues 82 are interposed between the tongues 84.

A rod 86 extends from each of the tongues 82 towards the substrate 12. Likewise, a rod 88 extends from each of the tongues 84 towards the substrate 12. The rods 86, 88 are substantially identical. The connecting structure 30 includes a connecting plate 90. The plate 90 is interposed between the tongues 82, 84 and the substrate 12. The plate 90 interconnects ends 92 of the rods 86, 88. Thus, the tongues 82, 84 are connected to each other with the rods 86, 88 and the connecting plate 90.

During fabrication of the nozzle arrangement 10, layers of material that are deposited and subsequently etched include layers of TiAlN, titanium and silicon dioxide. Thus, the thermal actuators 28, the connecting plates 90 and the static ink ejection structure 34 are of TiAlN. Further, both the retaining structures 52, 56, and the connecting members 74 are composite, having a layer 94 of titanium and a layer 96 of silicon dioxide positioned on the layer 74. The layer 74 is shaped to nest with the bridge portion 58 of the thermal actuator 28. The rods 86, 88 and the sidewalls 24 are of titanium. The tongues 82, 84 and the roof 22 are of silicon dioxide.

When the CMOS drive circuitry sets up a suitable current in the thermal bend actuator 28, the connecting member 74 is driven in an arcuate path as indicated with an arrow 98 in FIG. 13. This results in a thrust being exerted on the connecting plate 90 by the rods 86. One actuator 28 is positioned on each of a pair of opposed sides 100 of the roof 22 as described above. It follows that the downward thrust is transmitted to the roof 22 such that the roof 22 and the distal tongues 84 move on a rectilinear path towards the substrate 12. The thrust is transmitted to the roof 22 with the rods 88 and the tongues 84.

The rods 86, 88 and the connecting plate 90 are dimensioned so that the rods 86, 88 and the connecting plate 90 can distort to accommodate relative displacement of the roof 22 and the connecting member 74 when the roof 22 is displaced towards the substrate 12 during the ejection of ink from the ink ejection port 26. The titanium of the rods 86, 88 has a Young's Modulus that is sufficient to allow the rods 86, 88 to return to a straightened condition when the roof 22 is displaced away from the ink ejection port 26. The TiAlN of the connecting plate 90 also has a Young's Modulus that is sufficient to allow the connecting plate 90 to return to a starting condition when the roof 22 is displaced away from the ink ejection port 26. The manner in which the rods 86, 88 and the connecting plate 90 are distorted is indicated in FIGS. 14 to 19.

For the sake of convenience, the substrate 19 is assumed to be horizontal so that ink drop ejection is in a vertical direction.

Figure 18:
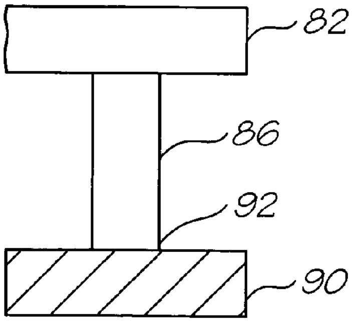
FIG. 18 shows a schematic view of a part of the coupling structure attached to a connecting member of the nozzle arrangement when the nozzle arrangement is in a quiescent condition.
Figure 19:
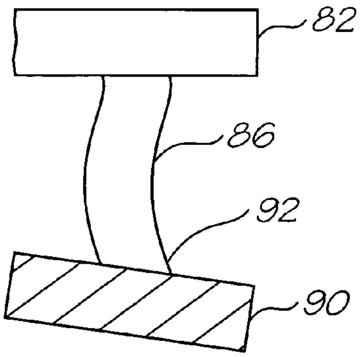
FIG. 19 shows the part of FIG. 18 when the nozzle arrangement is in an operative condition.

As can be seen in FIGS. 18 and 19, when the thermal bend actuator 28 receives a current from the CMOS drive circuitry, the connecting member 74 is driven towards the substrate 12 as set out above. This serves to displace the connecting plate 90 towards the substrate 12. In turn, the connecting plate 90 draws the roof 22 towards the substrate 12 with the rods 88. As described above, the displacement of the roof 22 is rectilinear and therefore vertical. It follows that displacement of the distal tongues 84 is constrained on a vertical path. However, displacement of the proximal tongues 82 is arcuate and has both vertical and horizontal components, the horizontal components being generally away from the roof 22. The distortion of the rods 86, 88 and the connecting plate 90 therefore accommodates the horizontal component of movement of the proximal tongues 82.

Figure 15:
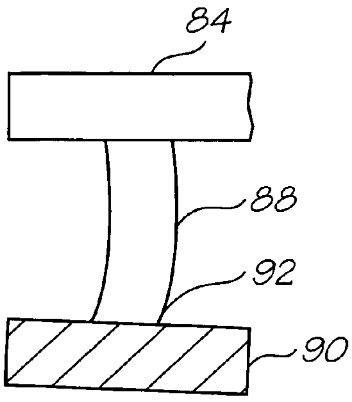
FIG. 15 shows the part of FIG. 14 when the nozzle arrangement is in an operative condition.
Figure 16:
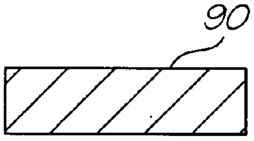
FIG. 16 shows an intermediate section of a connecting plate of the coupling structure, when the nozzle arrangement is in a quiescent condition.
Figure 17:
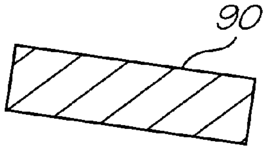
FIG. 17 shows the intermediate section of FIG. 16, when the nozzle arrangement is in an operative condition.

In particular, the rods 86 bend and the connecting plate 90 rotates partially as shown in FIG. 19. In this operative condition, the proximal tongues 82 are angled with respect to the substrate. This serves to accommodate the position of the proximal tongues 82. As set out above, the distal tongues 84 remain in a rectilinear path as indicated by an arrow 102 in FIG. 15. Thus, the rods 88 that bend as shown in FIG. 15 as a result of a torque transmitted by the plate 90 resist the partial rotation of the connecting plate 90. It will be appreciated that an intermediate part 104 between each rod 86 and its adjacent rod 88 is also subjected to a partial rotation, although not to the same extent as the part shown in FIG. 19. The part shown in FIG. 15 is subjected to the least amount of rotation due to the fact that resistance to such rotation is greatest at the rods 88. It follows that the connecting plate 90 is partially twisted along its length to accommodate the different extents of rotation. This partial twisting allows the plate 90 to act as a torsional spring thereby facilitating separation of the ink drop 70 when the roof 22 is displaced away from the substrate 19.

At this point, it is to be understood that the tongues 82, 84, the rods 86, 88 and the connecting plate 90 are all fast with each other so that relative movement of these components is not achieved by any relative sliding movement between these components.

It follows that bending of the rods 86, 88 sets up three bend nodes in each of the rods 86, 88, since pivotal movement of the rods 86, 88 relative to the tongues 82, 84 is inhibited. This enhances an operative resilience of the rods 86, 88 and therefore also facilitates separation of the ink drop 70 when the roof 22 is displaced away from the substrate 12.

Figure 20:
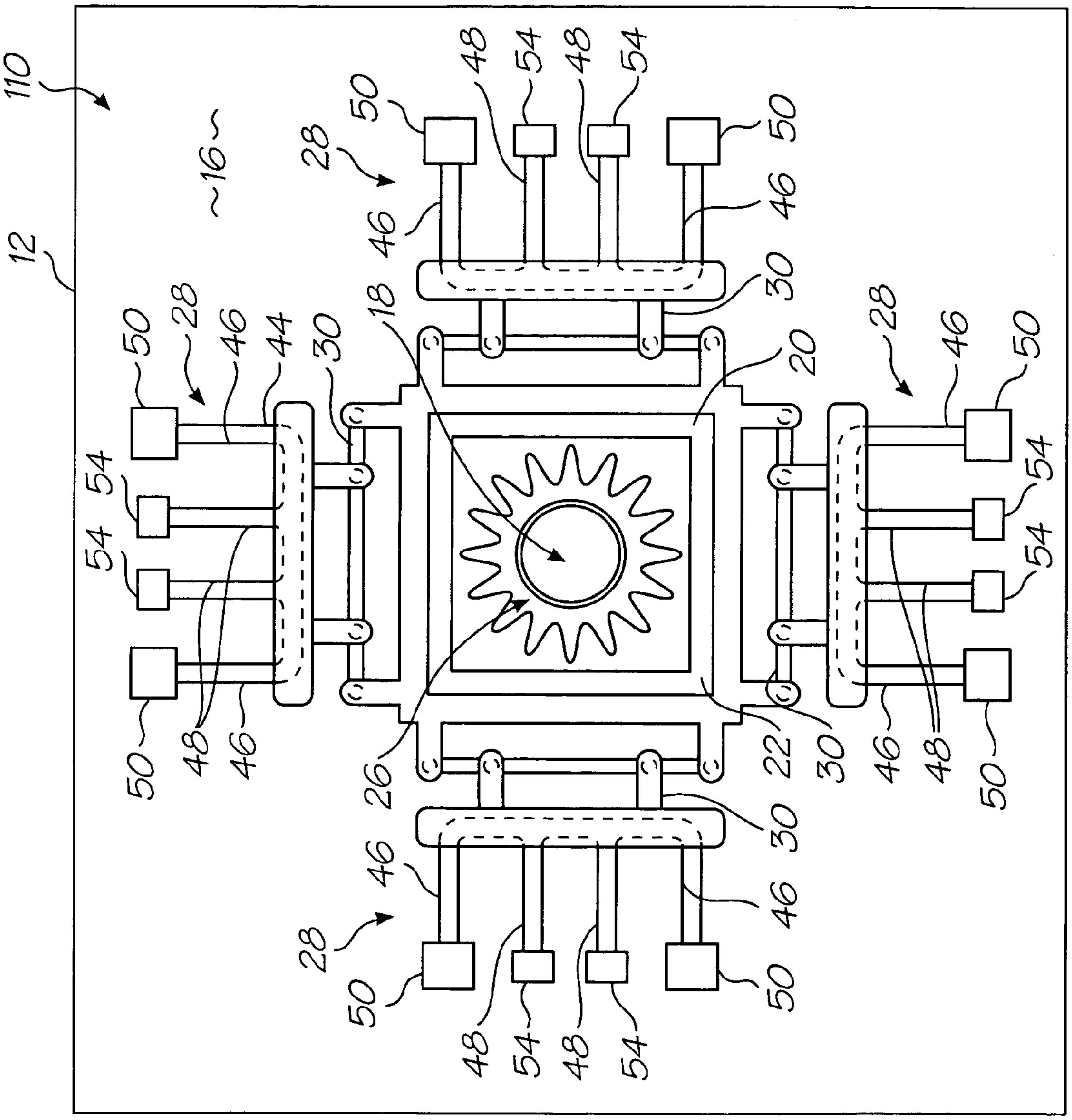
FIG. 20 shows a plan view of a nozzle arrangement of a second embodiment of a printhead chip, in accordance with the invention, for an ink jet printhead.

In FIG. 20, reference numeral 110 generally indicates a nozzle arrangement of a second embodiment of a printhead chip, in accordance with the invention, for an ink jet printhead. With reference to FIGS. 8 to 19, like reference numerals refer to like parts, unless otherwise specified.

The nozzle arrangement 110 includes four symmetrically arranged thermal bend actuators 28. Each thermal bend actuator 28 is connected to a respective side 112 of the roof 22. The thermal bend actuators 28 are substantially identical to ensure that the roof 22 is displaced in a rectilinear manner.

The static ink ejection structure 34 has an inner wall 116 and an outer wall 118 that together define the wall portion 36. An inwardly directed ledge 114 is positioned on the inner wall 116 and extends into the nozzle chamber 42.

A sealing formation 120 is positioned on the outer wall 118 to extend outwardly from the wall portion 38. It follows that the sealing formation 120 and the ledge 114 define the ink displacement formation 40.

The sealing formation 120 includes a re-entrant portion 122 that opens towards the substrate 12. A lip 124 is positioned on the re-entrant portion 122 to extend horizontally from the re-entrant portion 122. The sealing formation 120 and the sidewalls 24 are configured so that, when the nozzle arrangement 10 is in a quiescent condition, the lip 124 and a free edge 126 of the sidewalls 24 are in horizontal alignment with each other. A distance between the lip 124 and the free edge 126 is such that a meniscus is defined between the sealing formation 120 and the free edge 126 when the nozzle chamber 42 is filled with the ink 72. When the nozzle arrangement 10 is in an operative condition, the free edge 126 is interposed between the lip 124 and the substrate 12 and the meniscus stretches to accommodate this movement. It follows that when the chamber 42 is filled with the ink 72, a fluidic seal is defined between the sealing formation 120 and the free edge 126 of the sidewalls 24.

The Applicant believes that this related aspect of the invention provides a means whereby substantially rectilinear movement of an ink-ejecting component can be achieved. The Applicant has found that this form of movement enhances efficiency of operation of the nozzle arrangement 10. Further, the rectilinear movement of the active ink ejection structure 20 results in clean drop formation and separation, a characteristic that is the primary goal of inkjet printhead manufacturers.

The invention claimed is:

1. A method for forming a microelectromechanical fluid ejection device from a wafer in combination with a first layer covering a first surface of the wafer to form an interface therebetween, the method including the steps of:

forming a first bore into a surface of the first layer opposing the interface to a depth beyond the interface;

forming a second bore into a second surface of the wafer opposing the interface to a depth less than the interface; the first bore and the second bore meeting to form a fluid passageway; and forming a first plurality of spaced bores identical to, and simultaneous with, the first bore and forming a second plurality of correspondingly spaced bores identical to, and simultaneous with, the second bore in order to simultaneously produce a plurality of fluid passageways.

2. A method according to claim 1, wherein the second bore is formed after the first bore has been formed.

3. A method according to claim 1, wherein the first bore is formed after the second bore has been formed.

4. A method according to claim 1, wherein the wafer comprises a wafer of silicon.

5. A method according to claim 4, wherein the first layer comprises an interconnect layer.

6. A method according to claim 1, wherein the step of forming the first bore includes etching the first layer.

7. A method according to claim 1, wherein the step of forming the second bore includes etching the wafer.

8. A method according to claim 1, wherein the width of the inlet hole is between 8 microns and 24 microns.

9. A method according to claim 8, wherein the width of the inlet hole is between 10 microns and 28 microns.

* * * * *